United States Patent [19]
Ma

[11] Patent Number: 5,880,783
[45] Date of Patent: Mar. 9, 1999

[54] DIGITAL CAMERA FOR A COMPUTER

[76] Inventor: Hsi-Kuang Ma, 4F, No. 48, Sec. 2, Chung Cherng Rd, Taipei, Taiwan

[21] Appl. No.: 763,891

[22] Filed: Dec. 11, 1996

[30] Foreign Application Priority Data

Nov. 19, 1996 [TW] Taiwan ............................ 96 2 44221.6

[51] Int. Cl.$^6$ .................................................. H04N 5/225
[52] U.S. Cl. .......................... 348/373; 396/424; 396/419
[58] Field of Search ..................................... 348/373, 374, 348/375; 396/419, 422, 424, 428; 248/229.22, 228.3, 231.41, 918

[56] References Cited

U.S. PATENT DOCUMENTS

| | | | |
|---|---|---|---|
| 5,442,453 | 8/1995 | Takagi et al. ............................ | 358/335 |
| 5,550,754 | 8/1996 | McNelley et al. ....................... | 364/514 |
| 5,768,163 | 6/1998 | Smith, II ............................. | 364/705.01 |

*Primary Examiner*—Wendy Garber
*Assistant Examiner*—Jacqueline Wilson
*Attorney, Agent, or Firm*—Bacon & Thomas, PLLC

[57] ABSTRACT

A CCD camera including a photographic lens assembly having a photographic lens for picking up an image, a steering element at one side, and a signal output circuit, an adjustment block coupled to the steering element of the photographic lens assembly and having a steering element, and a circuit box coupled to the steering element of the adjustment block and having a circuit board to which the signal output circuit of the photographic lens assembly is connected, wherein by means of the steering elements of the photographic lens assembly and the adjustment block, the adjustment block can be moved to adjust the position of the photographic lens assembly relative to the circuit box horizontally as well as vertically.

1 Claim, 3 Drawing Sheets

DIGITAL CAMERA FOR A COMPUTER

BACKGROUND OF THE INVENTION

The present invention relates to CCD cameras, and more particularly to such a CCD camera which is compact, and convenient for use with a notebook computer.

CCD (charge coupled device) has been intensively used in telecommunication and video equipment, for example, video telephone and video conference systems. In a video (conference) telephone system, a CCD camera converts images (real-life situations) taken from a graphic lens into dot-by-dot images in a computer's memory. The digitized images are compressed, then transmitted to the opponent's computer through a telephone for showing on a display screen of the opponent's computer. Conventional CCD cameras commonly use universal joints for connection between the circuit box (camera body) and the photographic lens assembly. These CCD cameras are heavy, and not convenient for use with a notebook computer.

SUMMARY OF THE INVENTION

It is one object of the present invention to provide a CCD camera which is compact. It is another object of the present invention to provide a CCD camera which is convenient for use with a notebook computer. According to the preferred embodiment of the present invention, a CCD camera is comprised of a circuit box holding a circuit board for converting images into dot-by-dot digitized images, a photographic lens assembly for taking images, and an adjustment block coupled between the photographic lens assembly and the circuit box by revolving shafts and adapted for adjusting the position of the photographic lens assembly relative to the circuit box horizontally as well as vertically. The circuit box has a sliding hook adapted for securing the CCD camera to the display unit of a notebook computer when the display unit is opened.

DETAILED DESCRIPTION OF THE PREFERRED EMBODIMENT

Figure 1:
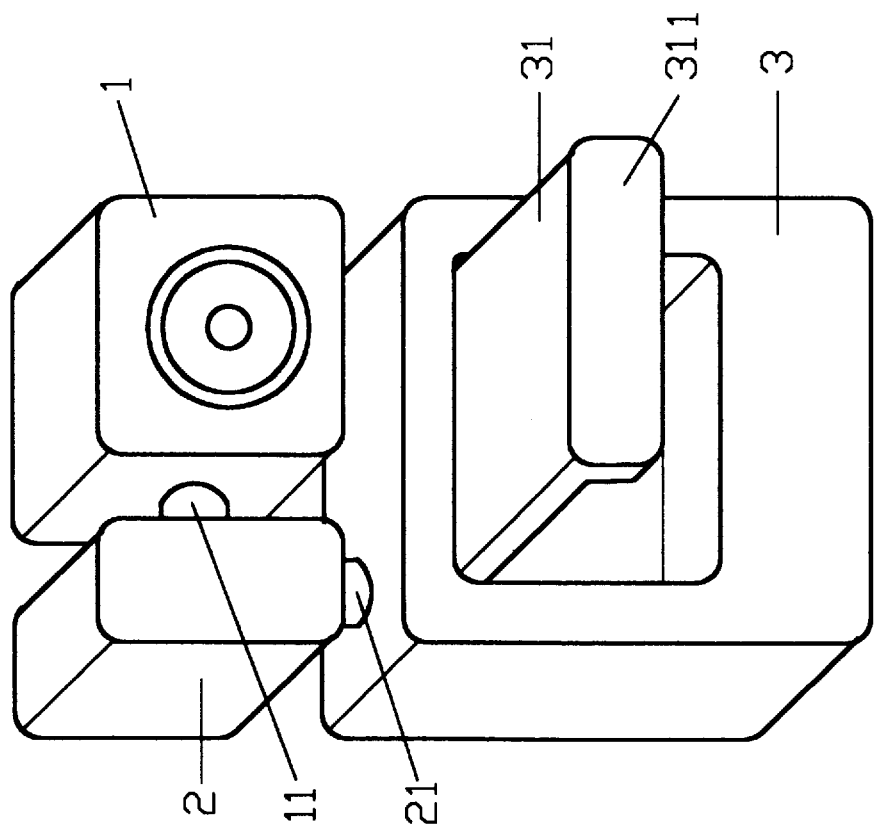
FIG. 1 is an elevational view of a CCD camera according to the present invention.

Referring to FIG. 1, a CCD camera in accordance with the present invention is generally comprised of a photographic lens assembly 1, an adjustment block 2, and a circuit box 3.

Figure 2:
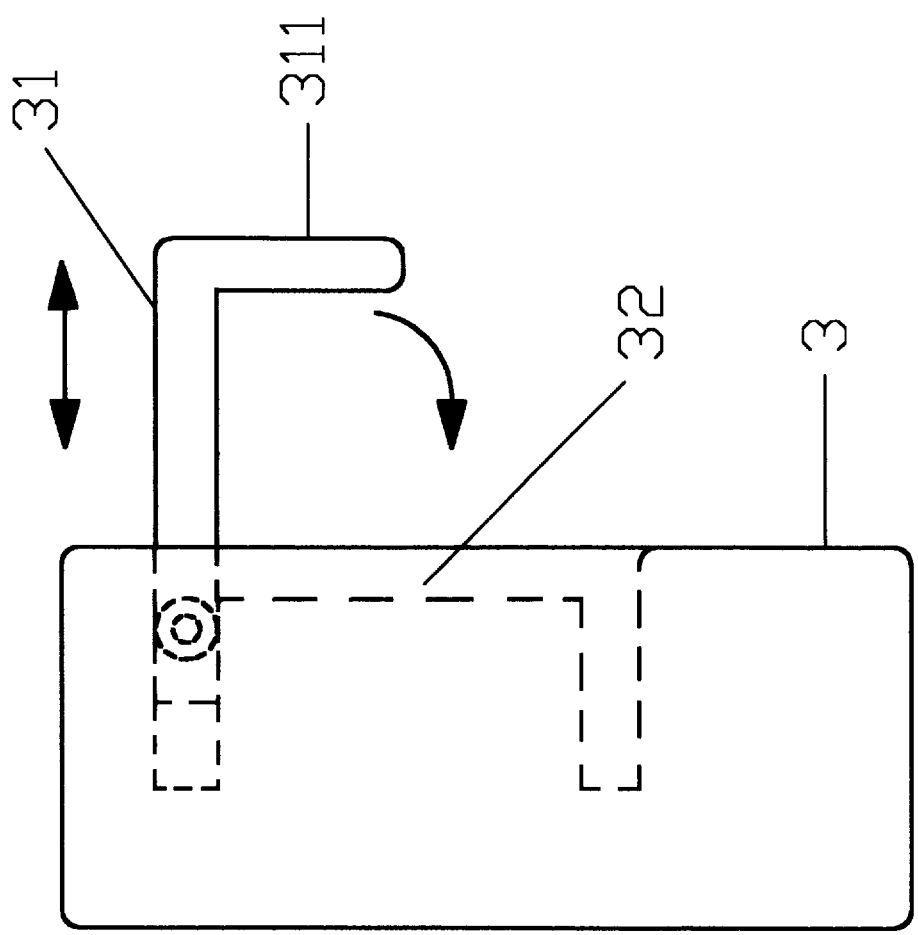
FIG. 2 is a side plain view of the circuit box according to the present invention, showing the moving direction of the sliding hook.

Referring to FIG. 2 and FIG. 1 again, the photographic lens assembly 1 comprises a photographic lens at the front side for picking up picture, an electric circuit behind the lens for connection to the internal circuit of the circuit box 3, and a tubular revolving shaft 11 at one side through which the electric circuit passes. The adjustment block 2 is coupled to the tubular revolving shaft 11 of the photographic lens assembly 1, having a downward tubular revolving shaft 21 at the bottom side coupled to the circuit box 3. The circuit of the photographic lens assembly 1 extends through the tubular revolving shaft 11 into the adjustment block 2, and then extends through the tubular revolving shaft 21 of the adjustment block 2 to the inside of the circuit box 3 to be connected to the internal circuit of the circuit box 3. The circuit box 3 is coupled to the tubular revolving shaft 21 of the adjustment block 2, and holds a circuit board on the inside. The circuit board of the circuit box 3 has terminal means adapted for receiving a video card input terminal connection cable, keyboard cable or power cable. As illustrated in FIG. 2, the circuit box 3 comprises a sliding hook plate 31 moved in a sliding groove 32 thereof. The rear end of the sliding hook plate 31 may be mounted with a spring element or supporting element, so that the sliding hook plate 31 can be moved in the sliding groove 32 and then positioned, or extended out and then turned downward to close the front side of the circuit box 3. The front end of the sliding hook plate 31 is an angled retaining portion 311 for mounting.

Figure 3:
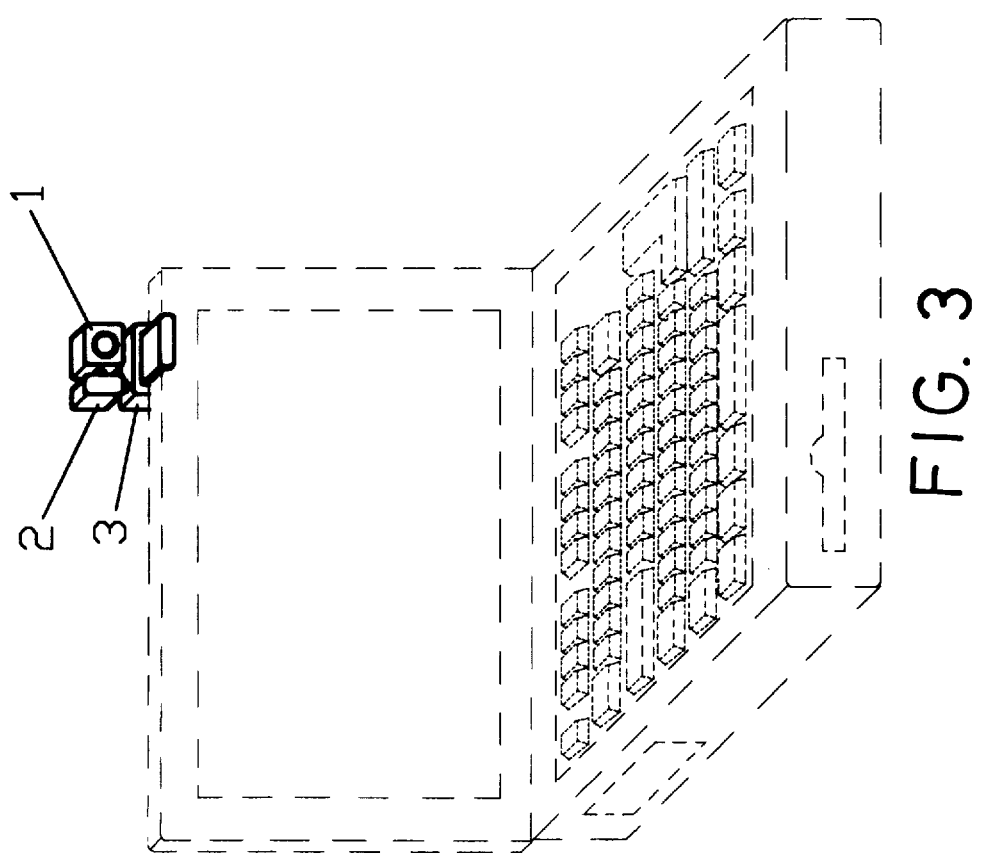
FIG. 3 is an applied view of the present invention, showing the CCD camera secured to the periphery of the display unit of a notebook computer.

Referring to FIG. 3, and FIGS. 1 and 2 again, through the sliding hook plate 31, the CCD camera can be fastened to a part of a notebook computer, for example, the periphery of the display unit. When installed, the adjustment block 2 is adjusted horizontally relative to the photographic lens assembly 1 and vertically relative to the circuit box 3. Vacuum mount, hook and loop materials, etc., may be fastened to the CCD camera, so that the CCD camera can be mounted on a computer monitor.

It is to be understood that the drawings are designed for purposes of illustration only, and are not intended as a definition of the limits and scope of the invention disclosed.

What the invention claimed is:

1. A digital camera for a computer comprising:

a photographic lens assembly having a photographic lens at a front side for picking up an image, a first steering element at one side, and a signal output circuit;

an adjustment block coupled to the steering element of said photographic lens assembly, and having a second steering element; and a circuit box coupled to the steering element of said adjustment block and having a circuit board which receives the signal output circuit of said photographic lens assembly, wherein said circuit box comprises a front sliding groove, and a sliding hook movable in said front sliding groove, and adapted for closing said circuit box and securing said circuit box to an object alternatively, said sliding hook having a front end terminating in an angled retaining portion; and wherein by means of the first steering element of said photographic lens assembly and the second steering element of said adjustment block, said adjustment block can be moved to adjust the position of said photographic lens assembly relative to said circuit box horizontally as well as vertically.

* * * * *